(12) United States Patent
Parsa (10) Patent No.: US 6,895,945 B2
(45) Date of Patent: May 24, 2005

(54) SYSTEM AND METHOD FOR CONDITIONING OF INTAKE AIR FOR AN INTERNAL COMBUSTION ENGINE

(75) Inventor: Komad Parsa, Laguna Niguel, CA (US)

(73) Assignee: Parsa Investments, L.P., Laguna Niguel, CA (US)

( * ) Notice: Subject to any disclaimer, the term of this patent is extended or adjusted under 35 U.S.C. 154(b) by 0 days.

(21) Appl. No.: 10/679,993

(22) Filed: Oct. 6, 2003

(65) Prior Publication Data

US 2004/0065306 A1 Apr. 8, 2004

Related U.S. Application Data

(63) Continuation-in-part of application No. 10/402,279, filed on Mar. 27, 2003, which is a continuation of application No. 10/194,628, filed on Jul. 12, 2002, now Pat. No. 6,585,809.

(51) Int. Cl.$^7$ .............................................. F02M 33/00
(52) U.S. Cl. ................................................... 123/539
(58) Field of Search .............................. 123/3, 26, 585, 123/536–539, 559.1, 25 C, 1 A; 96/15

(56) References Cited

U.S. PATENT DOCUMENTS

| | | | | |
|---|---|---|---|---|
| 3,602,202 A | * | 8/1971 | Kobayashi | 123/1 A |
| 3,672,341 A | * | 6/1972 | Smith et al. | 123/536 |
| 3,792,690 A | * | 2/1974 | Cooper | 123/3 |
| 3,961,609 A | * | 6/1976 | Gerry | 123/567 |
| 4,064,840 A | * | 12/1977 | Vierling | 123/3 |
| 5,051,113 A | * | 9/1991 | Nemser | 95/54 |
| 5,678,518 A | * | 10/1997 | Grothe et al. | 123/298 |
| 5,937,799 A | * | 8/1999 | Binion | 123/25 C |
| 6,543,428 B1 | * | 4/2003 | Blandino et al. | 123/585 |
| 6,675,780 B1 | * | 1/2004 | Wendels et al. | 123/536 |

\* cited by examiner

*Primary Examiner*—Marguerite McMahon
(74) *Attorney, Agent, or Firm*—O'Melveny & Myers LLP (57) ABSTRACT

A system for conditioning intake air for an internal combustion engine includes an oxygen separation system. The oxygen separation system includes an entry port for ambient air, and at least two separate exhaust ports through which separate exhaust streams are drawn by separate suction sources. The oxygen separation system further includes a plurality of gas-permeable electrodes that are charged to provide a high-voltage static electric field inside the separator. An exhaust stream taken from the anode side of the separator is enriched in oxygen relative to ambient air. This oxygen-enriched stream is provided to an internal combustion engine for use in combusting fuel.

26 Claims, 4 Drawing Sheets

SYSTEM AND METHOD FOR CONDITIONING OF INTAKE AIR FOR AN INTERNAL COMBUSTION ENGINE

RELATED APPLICATION

This application is a continuation-in-part of application Ser. No. 10/402,279, filed Mar. 27, 2003, which is incorporated herein by reference and which is a continuation of Ser. No. 10/194,628, filed Jul. 12, 2002, now U.S. Pat. No. 6,585,809.

BACKGROUND OF THE INVENTION

1. Field of the Invention

The present invention relates to a method and system for conditioning of intake air and/or exhaust gases for an internal combustion engine.

2. Description of Related Art

For many combustion engines, including various gasoline and diesel designs, it is beneficial to supply sufficient air to the combustion chamber for combusting all of the fuel in the combustion chamber. Complete combustion decreases fuel consumption, and reduces emissions such as hydrocarbons and carbon monoxide. Achieving complete combustion, however, requires operating the engine at a leaner air/fuel ratio than will provide the maximum power output. For example, for most gasoline engines, an air/fuel ratio of 15:1 to 16:1 yields optimal fuel efficiency, while the stoichiometric ratio is about 14.7:1, and maximum power is realized between about 12.5:1 and 13.5:1. Many modern engines control the air/fuel ratio depending on the engine operating conditions, operating more leanly at low power than at high.

Because combustion engines are limited to a fairly narrow range of optimal air/fuel ratios, an engine of a given size is limited by its design to a certain maximum power output. An engine's power is limited by the amount of fuel it can combust, which is, in turn, limited by the amount of air it takes in (airflow). The airflow of an engine depends on its displacement, engine speed (e.g., rpm), and volumetric efficiency. Displacement is generally fixed based on the engine design. Volumetric efficiency is defined as the amount of air taken in by an engine, divided by the theoretical maximum amount of air that can be taken in under the same conditions. It is seldom greater than about 80–85% for a naturally aspirated gasoline engine, and typically diminishes greatly at high engine speeds. For example, at 1000 rpm, an engine's volumetric efficiency may be 75%, at 2000 rpm 85%, and at 3000 rpm 60%.

It is theoretically desirable to have volumetric efficiency as high as 100%, or even greater, at all engine speeds. Generally, a well-designed engine with a high volumetric efficiently can be made lighter than an engine of comparable power having a lower volumetric efficiency. Volumetric efficiency is often raised using a turbocharger or supercharger to compress the engine's intake air. Volumetric efficiency can be increased to greater than 100% using such devices.

However, turbochargers and superchargers have their own disadvantages. For one thing, such devices are relatively expensive. More fundamentally, using compressed intake air inevitably results in a higher engine compression ratio than using natural aspiration in the same engine. This, in turn, causes higher engine stress that may shorten engine life, and/or may require increasing the mass of engine components or making other modifications to handle the higher stresses. In gasoline engines, higher compression ratios often necessitate the use of higher-octane (premium) gasoline, which is more expensive than regular gasoline. Another disadvantage is higher combustion temperatures, because the air/fuel mixture experiences increased compression heating prior to ignition. In turn, higher combustion temperatures may increase generation of undesired emissions, and in particular, nitrous oxides ($NO_x$). Higher combustion temperatures may also increase engine temperature, shortening the engine life and/or requiring increasing the capacity of the engine's cooling system or making other modifications to handle the higher temperatures.

Many of the benefits of increased volumetric efficiency, without the disadvantages associated with compressing intake air, may be realized by enriching intake air with oxygen. Simply put, using oxygen-enriched intake air can increase the amount of oxygen available for combustion, without requiring any compression of intake air. However, there is presently no effective solution for enriching intake air with oxygen, without drawing oxygen from a finite source such as a bottle. To avoid the limitations of bottled oxygen, it would be preferable to enrich intake air with oxygen in a continuous process, using only ambient air as a feedstock. But present methods of separating oxygen from air are too heavy, too bulky, and/or two expensive for practical application with most combustion engines. It is desirable, therefore, to provide an oxygen-enrichment system for a combustion engine that is sufficiently compact, lightweight and cost-effective for use in many common engine applications. It is further desirable to provide an internal combustion engine incorporating an oxygen-enrichment system for conditioning intake air, thereby attaining benefits similar to turbocharging or supercharging, without the disadvantages associated with an increased compression ratio.

SUMMARY OF THE INVENTION

The invention provides a method and system for conditioning intake air for an internal combustion engine, that overcomes the limitations of the prior art. The method and system achieve oxygen enrichment of intake air, without drawing on any external source of oxygen. The invention may be implemented using lightweight, compact, and relatively inexpensive equipment that may be configured for a variety of different engines. The invention further provides an internal combustion engine with an intake air conditioning system that may be operated to achieve increased power, efficiency, and/or reduced emissions, without increasing the pressure of the intake air.

In an embodiment of the invention, a system comprises an oxygen separation system connected to supply oxygen-enriched air to the air intake manifold of an internal combustion engine. The oxygen separation system comprises a substantially sealed passageway extending between a first exhaust port and a second exhaust port. An air entry port opens into the passageway, between the first exhaust port and the second exhaust port. At least two gas-permeable electrodes are disposed inside the passageway, defining an ionization chamber bounded at opposing surfaces by an electrode. A high-voltage static electric field may be applied between the opposing electrodes. When voltage is so applied, air may be drawn through a static electric field in the ionization chamber, by applying suction to the exhaust ports. The air entry port is preferably configured such that the ionization chamber is maintained at a pressure less than atmospheric during operation.

Optionally, more than two gas-permeable electrodes may be provided in the passageway, dividing it into adjacent sections. These sections may be bounded by electrodes of the same polarity, or of opposite polarity. At least one section, however, is bounded by electrodes of opposite polarity. A static electric field in adjacent sections may be maintained in a uniform direction through the passageway, by appropriately maintaining the polarity of each section. Essentially, each section may be configured as an ionization chamber containing an electric field that is not opposed to the electric field in other sections along the passageway. In the alternative, some of the sections may be configured as neutral chambers, being bounded by electrodes of substantially the same charge.

One of the at least two electrodes (an anode) may be positively charged. The other electrode (cathode) may be negatively charged. The passageway is configured such that air in the ionization chamber that is closest to the anode is drawn out the first exhaust port. This air may be enriched in oxygen, such as by having an oxygen content about 20–40% greater than ambient air. The passageway is further configured such that air closest to the cathode is drawn out the second exhaust port. This air may be depleted in oxygen, commensurate with the degree of oxygen enrichment in the first exhaust stream.

The electric field between the electrodes may cause a portion of the gas to become ionized. In an embodiment of the invention, the amount of ionization is increased by exposing the gas in the input space to ionizing radiation, such as from an ultraviolet lamp or other radiation source. In another embodiment, the electrodes may by themselves provide adequate ionization, without a further radiation source.

The system further may further include an internal combustion engine having an air intake manifold connected to receive oxygen-enriched air from the first exhaust port of the oxygen separation system. During engine operation, engine vacuum may be used to draw air through the oxygen separation system and its first exhaust port into the air intake manifold. In the alternative, or in addition, an air pump, such as a low vacuum pump, may be installed between the first exhaust port and the air intake manifold. If present, a pump should be configured to suction oxygen-enriched air through the oxygen separation system, out the first exhaust port, and into the air intake manifold.

In addition, an air metering system may be installed in the air line between the first exhaust port and the air intake manifold, to control the total volume of air and extent of oxygen enrichment in the air supplied to the engine. If present, the air metering system may comprise two inlets, a mixing section, and an outlet. One of its two inlets may be connected to the oxygen separation system and the other may receive ambient air. The outlet may be connected to the air intake manifold. A flow control valve or valve may be configured to control the flow through one or both inlets. The flow control valve may be controlled by an electronic control system. An oxygen sensor may be placed in the outlet stream of the air metering system and connected to provide data to the electronic control system. An air pressure sensor may be similarly placed and connected. The electronic control system may also be connected to control the pump speed, if a pump is present; and/or to control the voltage supplied to the electrodes of the oxygen separation system.

The second exhaust port of the oxygen-separation system may be connected to the engine exhaust, so as to draw air through the oxygen-separation system and out the second exhaust port. In the alternative, or in addition, a second mechanical pump may be configured to draw air from the second exhaust port and into the engine exhaust. In the alternative, the second pump may discharge air from the second exhaust port into the atmosphere. If present, the second pump may also be controlled by the electronic control system.

A static high-voltage source may be connected to the electrodes for providing the static electric field between the gas-permeable electrodes of the oxygen separation system. The high-voltage source may be powered by the engine's electrical system. For example, a continuous high voltage may be drawn from the engine's ignition system. In the alternative, a separate source may be used. Optionally, the voltage output from the high-voltage source may be controlled using the electrode control system. The voltage may vary from zero during engine ignition, up to its maximum voltage when the engine is operating at maximum power. Up to the point where spark discharge begins to occur, increasing the voltage supplied to the electrodes should generally increase the degree of oxygen enrichment from the oxygen separation system. When the engine is operating at peak power, it will consume the greatest quantity of fuel, and will reach its maximum requirement for oxygen. Thus, maximum voltage may be supplied to the electrodes when the engine is operating at peak power. In the alternative, or in addition, the voltage supply may be held constant and the degree of oxygen enrichment controlled using the air metering system.

A further alternative, which advantageously may operate without active control, is to hold the voltage constant and connect the first exhaust port to the engine vacuum. The ports of the oxygen separator may be configured so that the oxygen separation system reaches its maximum oxygen output when the engine draws its maximum vacuum. When voltage is fixed, oxygen output from the oxygen separation system will generally increase as pressure in the ionization chamber is reduced below atmospheric. This occurs because ionization of oxygen, and free movement of oxygen ions towards the anode side, both increase as pressure is reduced. But below a certain optimal pressure, which will vary depending on the design of the oxygen separation system, the mass flow of oxygen decreases as the total oxygen throughput decreases with decreasing pressure. Thus, the system may be designed so that the optimal pressure is obtained in the oxygen separator—coinciding with maximum oxygen output—when the engine draws its maximum vacuum.

A more complete understanding of the method and system for conditioning intake air for an engine will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a flow diagram showing exemplary steps of a method for oxygen separation according to the invention.

FIG. 2 is a diagram showing an exemplary multistage system for oxygen separation.

FIG. 3 is a diagram showing an exemplary multistage system for oxygen separation, according to an alternative embodiment of the invention.

FIG. 4A is a diagram showing an exemplary combined main air intake and oxygen separator for use with a combustion engine.

FIG. 4B is a diagram showing an exemplary combined main air intake and oxygen separator for use with a combustion engine, according to an alternative embodiment of the invention.

FIG. 5 is a diagram showing an exemplary system for conditioning intake air for an internal combustion engine.

DETAILED DESCRIPTION OF THE PREFERRED EMBODIMENT

Figure 1:
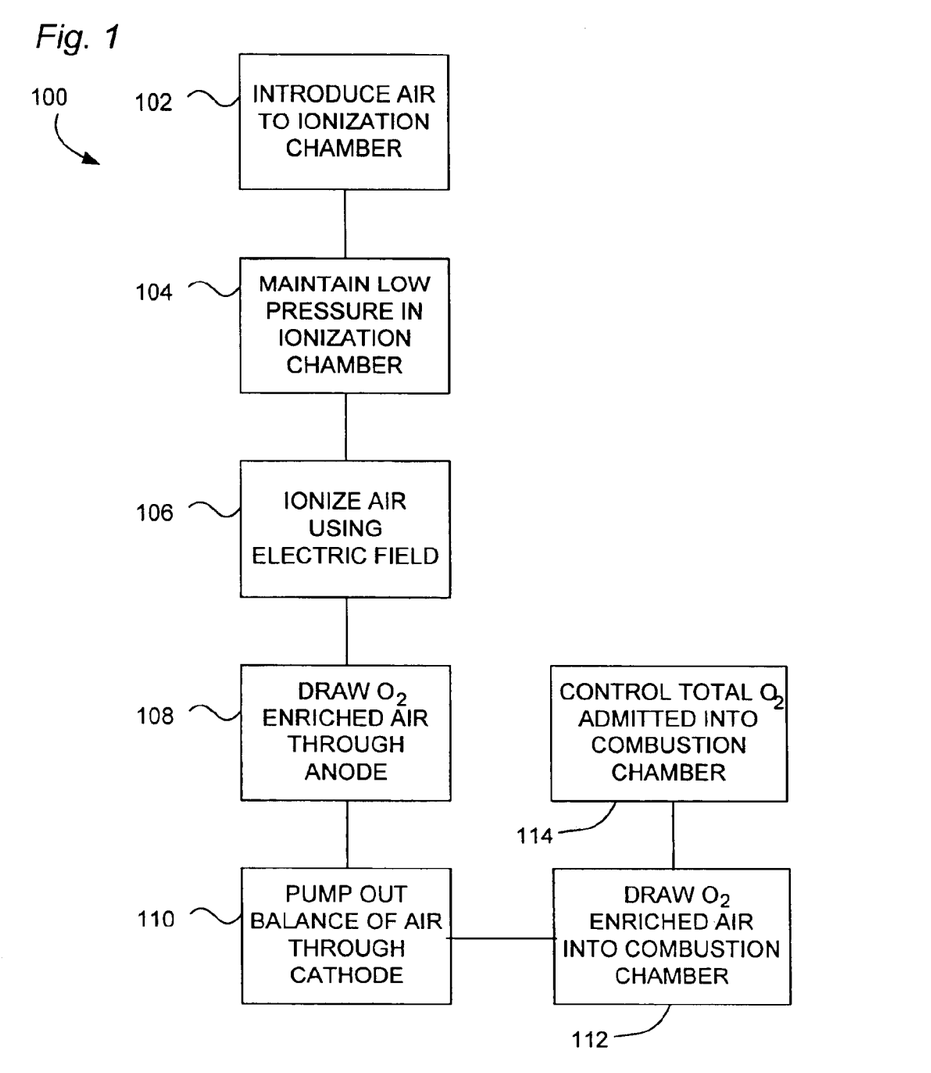

The present invention provides a method and system for separation of a constituent from a gaseous mixture. FIG. 1 shows exemplary steps of a method 100 for conditioning the air intake of an internal combustion engine, according to the invention. Method 100 may be performed using any of the systems disclosed herein, or any other suitable equipment. Steps 102–114 may be performed continuously and concurrently as a continuous method. At step 102, air is introduced into an oxygen separation system comprising a passageway connecting separate exhaust ports, a plurality of gas-permeable electrodes disposed in the passageway for providing a static electric field through at least a portion of the passageway, and an entry port into the passageway between the two exhaust ports. At least two of the electrodes are configured at opposing ends of at least a portion of the passageway, thereby providing an enclosed ionization chamber. Optionally, the air pressure is reduced and regulated by a throttle valve in-line with the entry port. In the alternative, the entry port has a fixed flow capacity. An entry plenum, having a plurality of small openings leading into the ionization chamber, may be used to introduce the inlet air under laminar (or less turbulent) flow conditions. The ionization chamber comprises oppositely-charged electrodes of static polarity separated by a volume for containing the gaseous mixture. One of the electrodes is a cathode and the other is an anode.

At step 104, a low pressure is maintained in the ionization chamber. "Low pressure" refers to a pressure less than atmospheric, such as between about 1–29 inches of mercury vacuum, or between about 0.05 and 0.95 atmospheres. Low pressure is maintained by controlling the exhaust flows relative to the entry port until the desired pressure is maintained in the ionization chamber. The optimal pressure will vary, depending on parameters such as the electrode voltage and spacing.

At step 106, gas between the anode and cathode is ionized. Ionization may be driven by an electric field between the anode and cathode, by a separate radiation source, or by some combination of radiation and an electric field. Depending on system limitations and application requirements, it is generally desirable to increase the strength of the electric field to the extent possible without causing arc discharges to occur. Likewise, increasing the distance between the anode and the cathode may also aid in the separation of the ionized gases, so long as the electric field between the electrodes remains sufficiently intense to promote ionization and separation. As a result of the ionization, oxygen ions are attracted towards the anode, where they may be neutralized. The balance of the air is either attracted to the cathode, or is unaffected by the electric field. As a result, air adjacent to the anode will be enriched in oxygen relative to air adjacent to the cathode.

At step 108, the oxygen-enriched air adjacent to the anode is pumped out and discharged from the ionization chamber. This may be performed by applying suction to an exhaust plenum disposed against the anode, using any suitable pump or vacuum source, including engine vacuum. Similarly, at step 110, oxygen-depleted air adjacent to the cathode is pumped out and discharged from the ionization chamber. Again, an exhaust plenum disposed against the cathode and suctioned by a suitable pump or other vacuum source may be used to remove oxygen-depleted air. The engine exhaust system may be used to assist in removal of air from the cathode side of the oxygen separation system. Experimental results showed that oxygen enrichment in the range of about 30%–40% above ambient levels may readily be achieved in the exhaust stream from the anode side of the oxygen separator.

At step 112, air that is enriched in oxygen is drawn into the combustion chamber. The engine may be naturally aspirated. In the alternative, inlet air may be supplied by a pump or blower such as may be used to reduce the air pressure in the oxygen separation system. The additional oxygen content may be used to promote combustion at a lower cylinder pressure than would be possible using a traditional turbocharger or supercharger. The optimal extent of oxygen enrichment may vary under different operating conditions, for example, between about 5% and 50% increase over ambient conditions, although the invention is not limited to this range. It is believed that the total percentage of oxygen in the combustion chamber should not be too great for engines designed to operate on air, but will vary depending on engine design. It should be appreciate that the invention is not limited to use with ground-based engines, but may also be used for high-altitude applications such as prop-engine planes and helicopters. The overall efficiency of the system may actually improve at higher altitudes, as it may become unnecessary to expend energy for maintaining a reduced air pressure in the ionization chamber.

For many applications, it may be beneficial to control the total amount of oxygen supplied to the engine. Accordingly, at optional step 114, a suitable control system is used to control the amount of oxygen supplied depending on engine operating conditions. For example, under higher load conditions the amount of oxygen supplied may increase. Various systems may be used to accomplish this step. One example is a feedback-controlled air metering system that may be used to blend the oxygen enriched air from the oxygen separation system with ambient air, upstream of the engine air intake port. An adjustable valve, or any other suitable control mechanism, may be used to control the proportion of oxygen-enriched air to ambient air in the inlet stream. Other examples of systems for controlling total oxygen may include a feedback-controlled voltage control system for controlling the voltage supplied to the oxygen separation system, and/or a vacuum pump control system for controlling air flow and pressure through the oxygen control system.

Figure 2:
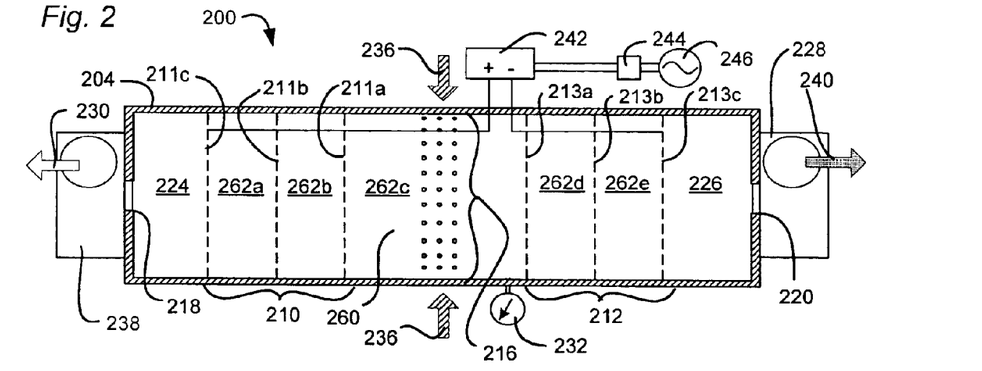

FIG. 2 shows an oxygen separator system 200 according to the invention. Separator system 200 and its elements are shown in a simplified, diagram format. One of ordinary skill in the art will be able to select and assemble a system according to the invention from FIG. 2 and the accompanying description herein.

Oxygen enrichment of greater than 30% was achieved using a system similar to that shown in FIG. 2. An ionization chamber pressure in the range of about 1–4 inches Hg below atmospheric pressure (between about 0.85 and 0.95 atmospheres) was found to be suitable for producing a relatively high mass flow rate of oxygen-enriched air. No separate source of ionization was needed. The electric field was about 1150 V/in, generated by electrodes of opposite polarity spaced about 4 inches apart and charged to about 5000 V prior to operation of the system's vacuum pumps.

When the pumps operated, pressure between the electrodes dropped by about 4 inches Hg. The gas between the electrodes became partially ionized, as evidenced by an approximately 400 V voltage drop across the electrodes after vacuum was applied. Exhaust from the cathode end of the system was hotter than the ambient air. The increase in temperature of the cathode-end exhaust was proportional to the electric field power and voltage drop in the field induced by the vacuum pumps.

Oxygen separator system 200 comprises a section 262c that serves as an ionization chamber for ionizing a gaseous mixture. The ionization chamber comprises a space between oppositely-charged, gas permeable electrodes 211a, 213a that bound opposite ends of section 262c inside of an enclosure 204. The enclosure 204 may have any suitable shape, and defines a passageway 260 between opposing exhaust ports 218, 220. The gas-permeable electrodes 211a–b and 213a–b are disposed across the passageway at intervals, thereby providing a plurality of sections 262a–f each bounded at opposing ends by an electrode. The sections are disposed in serial fashion through most of the passageway, terminating at end sections 224, 226.

FIG. 2 shows a cutaway view of a cylindrical enclosure 204 defining passageway 260. Enclosure 204 may be made of any suitable non-conductive material, for example, plastic. To save space or to fit in a particular location, the enclosure may be curved or contoured along its length. In a prototype embodiment of the invention, enclosure 204 comprised a 14-inch length of ASTM D3034, 8-inch diameter PVC pipe, with its ends sealed by metal plates.

Enclosure 204 is provided with at least three gas ports connecting with passageway 260: entry port 216, exhaust port 218, and exhaust port 220. System 200 further comprises two gas-permeable electrode banks 210, 212 (an anode bank and a cathode bank) spaced apart and insulated from one another. The electrode banks are separated from each other by the ionization chamber 202. Each bank is comprised of a series of parallel spaced electrodes. Bank 210 is comprised of electrodes 211a–c, and bank 212 is comprised of electrodes 213a–c. The electrodes may be formed of any suitable conductive and gas-permeable material. Each electrode within a bank of electrodes may be maintained at the same voltage. For example, electrodes 211a–c may be maintained at the same positive voltage, and electrodes 213a–c may be maintained at the same negative voltage.

Entry port 216 is configured for discharging air directly into the space 262c between electrode banks 210, 212. Entry port 216 may be comprised of a plurality of small orifices that serve as an entry plenum to reduce the turbulence of air admitted into the ionization chamber 262c. In the illustrated embodiment, the entry port 216 is open to the environment, to admit ambient air. In the alternative, the entry port may be surrounded by a plenum (not shown) for control of the entry air. The plenum may have an inlet that is connected in series with an adjustment valve (not shown). Yet another alternative is to provide a discrete entry port into the ionization chamber, with or without a series-connected entry valve. In a prototype embodiment, a single discrete entry port about 0.75 inches in diameter was used, without an adjustment valve. If present, an adjustment valve may be used to throttle air flow into the ionization chamber, thereby providing for regulation of air pressure in section 262c (ionization chamber). If no entry valve is provided, pressure may be controlled by controlling the speed of the exhaust pumps, or by providing an adjustment valve on one or more of the exhaust ports.

Referring again to FIG. 2, ionization may be driven entirely by an electric field that is created between electrode banks 210 and 212, by connection to a high-voltage source 242. It may be desirable to increase the strength of the electric field up to but not exceeding a level that will result in arc discharge. A higher electric field strength may result in a higher level of ionization, as well as more efficient separation of oppositely-charged ions. Use of an ionizing radiation source (not shown) in the ionization chamber may permit lower electrode voltages to be used, all other things being equal. The ionization chamber 262c should be configured to produce negative ions predominately comprised of $O_2^-$, and positive ions predominately comprised of $N_2^+$.

Electrode banks 210, 212 may be configured in various ways. In an embodiment of the invention, each of their constituent electrodes 211a–c and 213a–c are conductive plates. For example, the electrodes may be aluminum or copper plates. In a prototype embodiment, the electrodes comprise thin circular aluminum plates perforated by equally-spaced holes. The electrode plates are oriented parallel to one another, and are mounted within enclosure 204 so as to divide the enclosure into a central enclosed volume (ionization chamber) 262c between the electrodes, and two exhaust plenums 224, 226, as shown in FIG. 2. Each electrode is gas-permeable to provide for fluid communication between the exhaust plenums 224, 226 and the ionization chamber 262c between the electrodes.

Electrode banks 210, 212 should be spaced apart far enough so that gas adjacent to one electrode bank, e.g., bank 210, is not likely to be suctioned into the exhaust plenum belonging to the opposite electrode, e.g., plenum 226 of electrode bank 212. At the same time, the electrode banks should not be spaced too far apart, as this will weaken the electric field and make separation of ions less likely. In other words, in selecting an appropriate spacing and configuration of the electrode, the fluid dynamics created by pump suction should be considered as well as the electric field between the electrodes. In a prototype embodiment, the electrode banks were spaced approximately 4 inches apart and were positioned symmetrically with respect to the center of the enclosure 204. Each electrode in the respective banks was positioned approximately 1.5 inches away from other electrodes in the same bank. A space of approximately 2 inches was provided between each electrode bank and its nearest exhaust port for each exhaust plenum 224, 226.

Pumps 228, 238 may be connected to exhaust ports 218, 220, and may be operated to create suction in exhaust plenums 224, 226, respectively. Engine vacuum may be used instead of, or in addition to, pumps 228, 238. Any suitable vacuum or suction pump may be used, depending on the intended mass flow rate through the system, the desired vacuum pressure in chamber 262c, and the electric field voltage. In a prototype embodiment, pumps 228, 238 comprised 145 mm 2-stage tangential bypass discharge vacuum pumps from Ametek® Lamb Electric of Kent, Ohio.

The flow of air into and out of system 200 may be controlled by an intake valve (not shown), exhaust valve (not shown), and/or by varying the speed of pumps 228, 230. Air may be drawn into the ionization chamber 262c as shown by arrow 236, because of suction provided by pumps 228 and 230 or from engine vacuum air within the chamber 262c is ionized by the electric field between electrode banks 210, 212, and ions of opposite polarity tend to propagate in opposite directions, towards an oppositely-charged one of the electrode banks. An oxygen-enriched portion of the air passes through electrode bank 210, and is discharged through exhaust port 218, as indicated by arrow 230. The balance of air flow passes through electrode bank 212 and is discharged through exhaust port 220, as indicated by arrow

240. Provided that chamber 102 is substantially sealed except for the gas ports, the inlet mass flow rate 236 will equal the sum of the exhaust flows 230, 240.

An electric field of static polarity is maintained between electrode banks 210, 212 by DC power source 242. Any suitable source of direct current (DC) power may be used, such as a discrete power supply. Power source 242 should be capable of maintaining the desired electrode voltage across the electrodes at a sustained power level. In a prototype embodiment, a DC-to-DC power converter, model SC-50 10 Watt, by American High Voltage of Elko, Nev., was used as a high voltage source 242. The power converter was designed to produce an output voltage of 0–5000 VDC, in proportion to an input voltage of 0–12 VDC. The power converter was powered by a AC-to-DC 9 V power supply 244, rated for 1200 mA maximum output. Power supply 244 was connected to ordinary 115 VAC household current 246. The output voltage of high voltage source 242 was nominally 5000 VDC prior to operation of the exhaust pumps. Although well below the voltage threshold for arc discharge, the voltage proved sufficient for attaining useful results in the separation of oxygen from air. Power dissipated by source 242 is believed to have been less than ten Watts.

For a given configuration of electrodes and voltage supplied to the electrodes, the voltage of the electric field may be related to the mass flow of ionized air through the ionization chamber. Using an apparatus of the type shown in FIG. 2 open to an ambient air environment, a voltage difference between the electrodes may decrease from an initial voltage measured when the ionization chamber is at atmospheric pressure. As gas is pumped out from the chamber, pressure in the chamber will be reduced if the entry port is sufficiently restricted. Surprisingly, the voltage difference between the electrodes will decrease as the exhaust pump speed is increased, until a certain vacuum level is obtained in the ionization chamber. That is, the maximum voltage drop is a function of the pump speed and input flow rate. If an input valve is in place on the entry port, as the valve is increasingly restricted, the maximum voltage drop will be observed at progressively slower pump speeds. The extent of voltage drop will depend on the characteristics of the voltage source, and is believed related to an electric current created by ionized gas flow between the electrodes. At pressures below the vacuum level at which a maximum voltage drop is observed, the voltage difference will again increase as the mass flow of gas between the electrodes decreases.

In a prototype system of the type shown in FIG. 2, the exhaust pumps described above were operated at their full design speed, drawing through a single entry port about 0.75 inches in diameter. In this mode, a pressure drop of about 5 inches Hg below atmospheric was measured by gauge 232. An oxygen sensor capable of reading percentage of oxygen in the range of 0–100% was positioned in the exhaust port of exhaust pump 228. The sensor was adjusted to read a concentration of 20% oxygen in ambient air, prior to placing in the exhaust port. Voltage drop at the voltage source 242 stabilized at about 400 V during operation of the pumps. Oxygen content stabilized at a level of about 26% total oxygen at the exhaust pump 240. Hence, the prototype successfully enriched the oxygen content of the exhaust by about 30%, relative to ambient levels. It is believed that greater oxygen enrichment is also possible, by implementing the features of the inventions disclosed herein.

Figure 3:
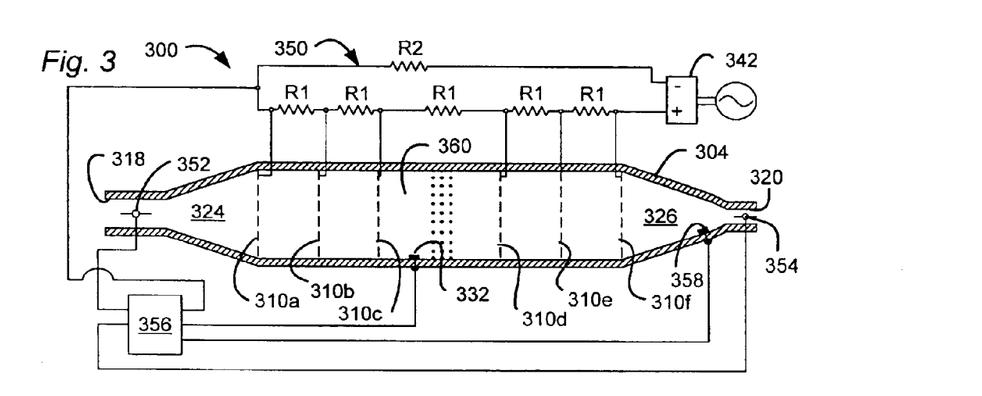

FIG. 3 shows an alternative system 300 for oxygen separation. Like system 200, system 300 includes a generally tubular enclosure 304 housing a plurality of permeable electrodes 310*a–f* in a passageway 360, an entry port 316 and two exhaust ports 218, 220 disposed at opposite ends of the passageway. Electrodes 310*a–f* are disposed across passageway 360, dividing it into a plurality of sections each bounded on opposing ends by an electrode. Differences from system 200 include tapered exhaust ports 318, 320 to promote laminar flow, a voltage divider circuit 350, exhaust control valves 352, 354, and controller 356. It should be appreciated that system 300 exemplifies various new features and modifications to system 200, and it is not necessary that all of these new features be used together at once. An oxygen separation system according to the invention may be constructed by selecting from these new features and modifications as desired.

Each electrode 310*a–f* may be connected to a different node of voltage divider circuit 350. Resistors R1 may be of equal value, and divide the output of high voltage source 342 into equal (or if desired, unequal) increments. High voltage source 342 is any suitable source of high-voltage DC current. Resistor R2 should be of comparatively high impedance relative to the sum of the impedances of resistors R1, so that substantially all of the voltage output of source 342 is available between the resistors R1. R2 should also be resistive enough to prevent unnecessary dissipation of power by circuit 350. Thus, for example, if voltage source 342 provides an output voltage of 50,000 V, this may be divided equally by resistors R1 into increments of 10,000 V each. Electrode 310*a*, when connected to circuit 350 as shown, will be the most negatively charged of electrodes 310*a–f*. Electrode 310*b* will be 10,000 V more positive than electrode 310*a*, while being 10,000 V more negative than electrode 310*c*; and so on down the sequence of electrodes to the most positive electrode 310*f*. Any other suitable voltage divider circuit may be used; for example, multiple high-voltage sources may be connected in series, with their connection nodes and end nodes dividing the sum of their voltage output.

Thus, an electric field of approximately uniform magnitude may be generated along the length of passageway 360. This relatively long high-voltage electric field should enhance ionization of oxygen, as well as separation of ionized oxygen from air. In effect, the space between adjacent electrodes may be used as an extension of the ionization chamber 302. The electric field between individual electrodes may be made as strong as desired, up to the threshold imposed by arcing. The total voltage drop across the bank of electrodes 310*a–f* may therefore be greater than would be possible using just two oppositely-charged electrode banks of equivalent spacing. In addition, just as in system 200, the presence of additional electrodes in the gas flow path may enhance net diffusion of ionic species towards an oppositely charged electrode, and reduce backwards diffusion. A still further advantage is that the tubular enclosure 304 may readily be curved, coiled or contoured along its length to fit in a desired space, and the static electric field required for separation of ionic species may be maintained along a curved flow path by placing electrodes at sufficiently close intervals along the curve.

Oxygen separation systems 300 or 200 may function without dedicated exhaust pumps in a system that includes an independent source of suction, e.g., an internal combustion engine. Hence, referring again to FIG. 3, system 300 is depicted without exhaust pumps. It should be appreciated, however, that suction should be applied to both exhaust ports 318, 320, thereby drawing gas in through entry plenum 316, for system 300 to operate in a manner similar to that described for system 200. Flow through system 300 may be controlled by valves 352, 354 connected in series with one or more of the exhaust ports. Exhaust port 318 may have a higher flow capacity than port 320, depending the intended purity of separation. For example, if 30% oxygen enrichment is desired, a ratio of 3:1 in the flow capacity of port 318 to 320 may be useful.

Oxygen separation system 300 may be configured for electronic control, for example by an engine control module, and/or by a dedicated controller 356. There are, of course, various ways that system 300 may be configured for automatic control. One approach may be to connect a controller 356, such as a programmable processor or controller, to sensors capable of measuring useful operating parameters. For example, controller 356 may be connected to an oxygen or other gas sensor 358 located in or near one of the exhaust plenums 326 or ports 354. In addition, or in the alternative, voltage drop of the divider circuit 350 may be measured. Generally, given a unvarying voltage supply, a voltage drop will be proportional to degree of ionization and gas separation. Another input may be provided by connecting to a pressure sensor 332 inside enclosure 304, such as near or in the ionization chamber 302. Controller 356 may be connected to control one or more of the exhaust valves 352, 354, whereby flow through system 300 may be controlled independently from a more complex system to which it may belong. In the alternative, or in addition, controller 356 may communicate with the engine control module to coordinate control of oxygen separation system 300 with the engine system.

Figure 4A:
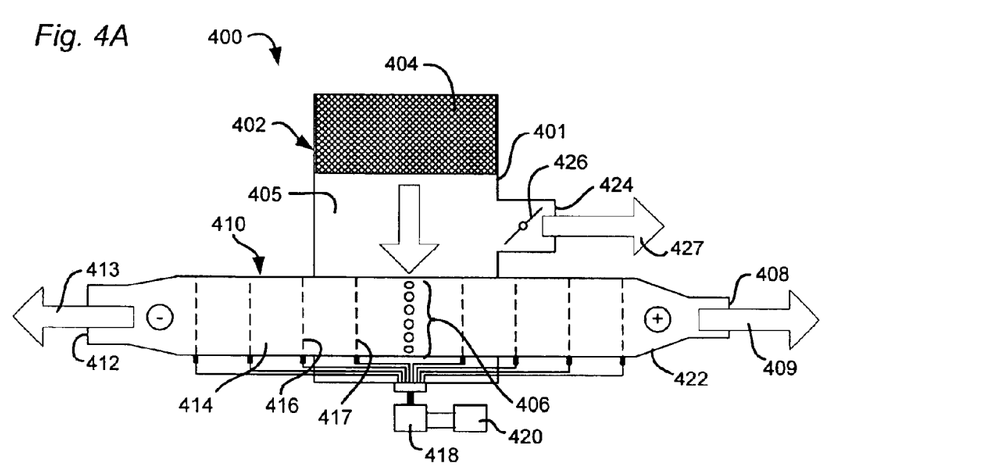

An oxygen separation system of the type described above may readily be incorporated into an airflow system such as found in many conventional combustion engines. For example, FIG. 4A shows an integrated air intake and oxygen separation system 400. System 400 comprises a main air intake 402 for holding an air filter 404 upstream and in series with an entry port 406 of an oxygen separation system 410. Main air intake 402 may be configured to provide a plenum 405 downstream of the filter 404 and surrounding the entry port 406. Entry port 406 may comprise a plurality of small openings. The total area of entry port 406 may be configured so that maximum total oxygen is output from the anode-side exhaust port 408 when the oxygen-enriched exhaust stream 409 reaches its maximum flow rate, which should occur when the internal combustion engine is operating at maximum power.

Oxygen separator 410 further comprises cathode-side exhaust port 412 from which an oxygen-depleted exhaust stream 413 may be drawn. An air passageway 414 is disposed along an interior of the oxygen separator, connecting the anode-side and cathode-side exhaust ports 408, 412. Passageway 414 may be divided into sections by a plurality of electrodes, e.g., electrodes 416, 417. Any number of the sections may be configured as an ionization/separation chamber by appropriately charging the electrodes using a high voltage source 418 connected to a power source 420. For automotive applications, high voltage source 418 may comprise an ignition coil, and power source 420 may comprise the battery and charging system.

An ambient air supply port 424 may be provided in housing 401 of main air intake 402, opening into plenum 405. An adjustable control valve 426 may be configured to control ambient air stream 427. It should be apparent that valve 426 need not be incorporated into housing 402. Ambient air stream 427 and oxygen-enriched air stream 409 may be combined by a downstream air metering system (not shown). In the alternative, port 424 may be omitted, and all engine air may be drawn from the oxygen-enriched port 408.

Yet another alternative is to blend oxygenated exhaust stream 409 with a portion of oxygen-depleted stream 413, with or without the addition of ambient air stream 427, for control of total oxygen.

Housing 401 may be made from any suitable material, such as any suitable plastic currently used for filter housings. Likewise, housing 422 for passageway 414 may be made from the same material, or from any similar or compatible material, as housing 401. These materials may include any suitable non-conductive plastic material that will maintain its shape and structural integrity in the heat of the engine compartment.

Figure 4B:
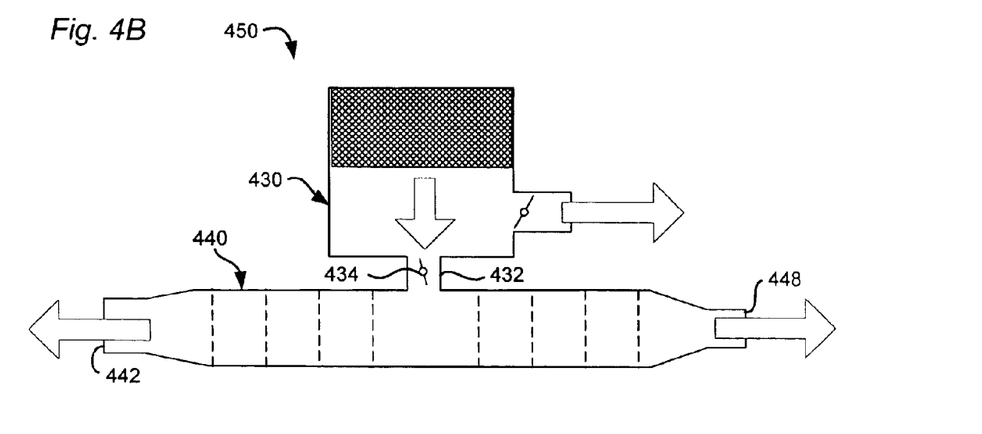

FIG. 4B shows a combination air intake and oxygen separation system 450 like system 400, differing in that main air intake 430 is connected to oxygen separation unit 440 via a discrete port 432 controlled by an adjustable valve 434. Valve 434 may be used to maintain a desired pressure and/or flow rate through oxygen separator 440. The presence of a valve may be particularly useful if the amount of suction applied to port 442 and/or port 448 varies under different engine conditions. For example, valve 434 may be opened as engine speed increases, maintaining a relatively constant pressure in separator 440 under different operating conditions.

Figure 5:
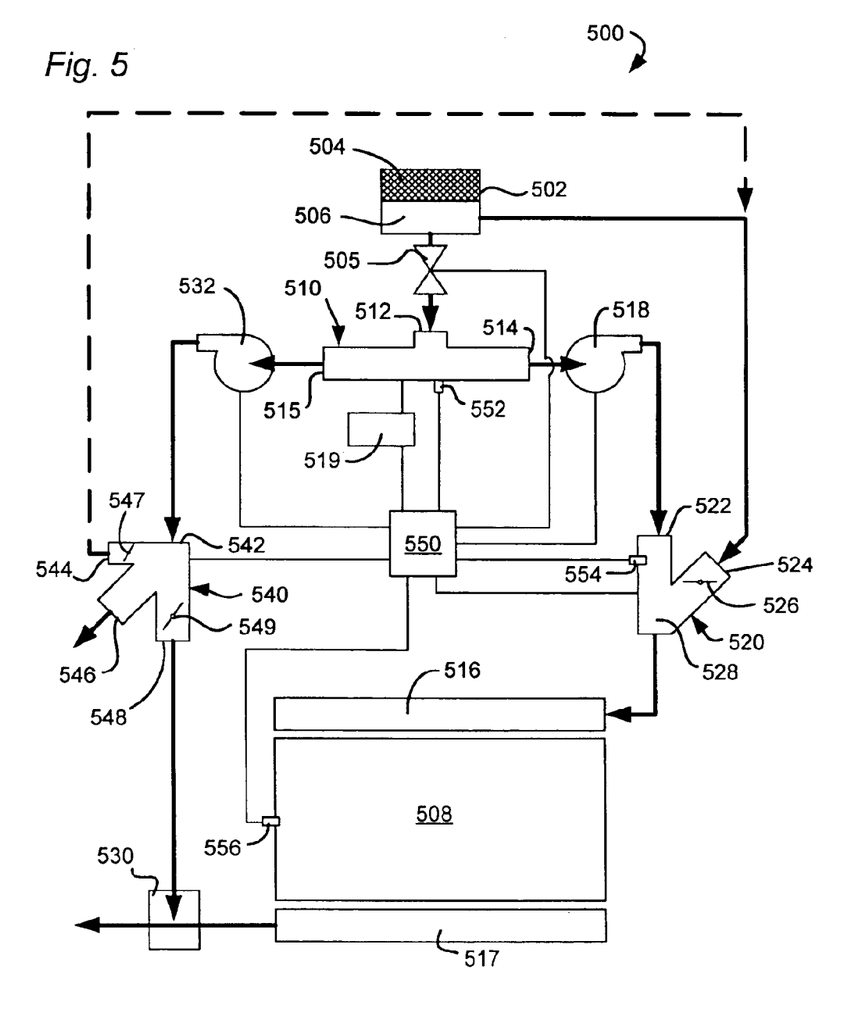

FIG. 5 shows an exemplary system 500 for conditioning intake air for an internal combustion engine 508. Air flow is indicated by bold dark arrows. Communication lines between system components are indicated by solid lines of regular weight. System 500 comprises a main air intake 502 through which intake air may be drawn. Air intake 502 optionally includes any suitable air filter 504 and a plenum 506.

Intake air may be drawn into an intake port 512 of oxygen separator 510, which may be of any suitable type described herein. Optionally, an adjustable control valve 505 is placed upstream and in series with intake port 512, to control flow into separator 510. Valve 505 may be continuously adjusted to maintain a desired pressure in separator 510, while the mass flow rate from separator 510 into engine 508 may be allowed to vary according to engine requirements. In the alternative, or in addition, intake port 512 may comprise a plurality of small openings leading from a plenum (such as plenum 506) into the oxygen separation system 510, or any other suitable opening.

A high voltage may be supplied to separator 510 using a high voltage source 519. High voltage source 519 may comprise any suitable high voltage source as known in the art. It may be powered by the engine 508 electrical system. For example, a portion of system 519 may comprise a high-voltage ignition system for engine 508.

Oxygen-enriched air may be drawn from an anode-side exhaust port of separator 510 and into an intake manifold 516 of engine 508. The oxygen-enriched air stream may be drawn directly into the intake manifold by the engine vacuum. In the alternative, any suitable vacuum pump 518 may be interposed between the oxygen separator 510 and intake manifold 516, to boost the amount of suction applied at the anode-side exhaust port 514 of separator 510. Vacuum pump 518 may be driven by its own motor, or may be driven by the engine 508 drive shaft or exhaust pressure, in the manner of a turbocharger or supercharger. Output from the vacuum pump 518 may be at any desired pressure, for example, at or above atmospheric pressure. An output pressure near atmospheric may be advantageous in reducing engine stress and increasing efficiency, as explained above.

In addition, or in the alternative, an air metering system 520 may be interposed between separator 510 and engine intake 516. Air metering system 520 may be used to control the total volume of air and oxygen content of air supplied to engine 508. Metering system 520 may comprise a first intake port 522 for oxygen-enriched air from separator 510, a second inlet port 524 for ambient air from main air intake 502, at least one adjustable control valve 526 to control the relative proportions of air drawn through its inlet ports, and a mixing section 528 wherein air drawn through the at least two inlet ports 522, 525 may be blended together. In addition, or in the alternative, a stream of oxygen-depleted air may be taken from cathode-side exhaust port 515 of separator 510, and mixed with the oxygen-enriched air from port 514, as engine conditions dictate.

Oxygen-depleted air may be drawn from exhaust port 515 of separator 510 using engine vacuum generated at the exhaust manifold 517 of engine 508. For example, air may be drawn into the exhaust system using a pulsed secondary air injection system ("PAIR system"), a venturi vacuum pump, or any other suitable exhaust-driven pump. In addition, or in the alternative, a vacuum pump 532 may be used to draw air out port 515. Like vacuum pump 518, vacuum pump 532 may be driven by its own motor, or may be driven by the engine 508 drive shaft or exhaust pressure, in the manner of a turbocharger or supercharger. Although air from port 515 may be depleted in oxygen relative to ambient air, it may contain more oxygen than normally is contained in exhaust from engine 508. Hence, the oxygen-depleted air stream may be used to increase the oxygen content in the engine exhaust in a manner similar to injection of ambient air into engine exhaust, the latter practice being known in the art.

It may be desirable to control the flow of oxygen-depleted air from cathode-side port 515 using a diverter 540, having an inlet port 542 and two or more outlet ports 544, 546, and 548. One or more adjustable valves 547, 549 may be used to distribute the oxygen-depleted air between the various outlet ports. One of the outlet ports 544 may direct a portion of the oxygen-depleted air stream into air metering system 520, for blending with the oxygen-enriched stream from port 514. Another outlet port 546 may direct a portion of the oxygen-depleted air stream to the atmosphere. Yet another port may direct a portion of the oxygen-depleted air into the engine exhaust stream, via a pump or other entry port 530. The proportion of oxygen-depleted air sent to various components of system 500 may vary, depending on engine conditions. In the alternative, all of the oxygen-depleted air may be exhausted to atmosphere, or to the engine exhaust, or put to any other desired use or combination of uses.

Selected components of system 500 may be connected and controlled via a system controller 550. Controller 550 may comprise any suitable electronic controller as known in the art. For example, it may comprise any suitable engine control module. There are numerous different ways which may be appropriate for controlling an engine air conditioning system of the type exemplified by system 500. Various alternative control systems may be developed by one of ordinary skill in the art.

Controller 550 may be connected to receive data concerning the state of system components. For example, controller 550 may receive air pressure data from a pressure sensor 552 positioned to sense pressure inside of oxygen separator 510. This pressure may be controlled via a connection to adjustable input valve 505, and/or by controlling suction applied to port 514 and/or port 515. For example, a speed of pump 518 and/or 532 may be controlled. For further example, suction may be controlled by adjusting a valve, such as valve 526 in the air metering system 520, at any suitable point downstream of exhaust port 514 or 515. Controller 550 may further be connected to control and/or to measure the voltage supplied by high voltage source 519 to oxygen separator 510. Regulation of pressure and voltage in separator 510, in turn, may provide control of over the oxygen content of the oxygen-enriched air stream.

The oxygen content of the air stream for supply to engine 508 may also be measured directly. For example, controller 550 may be connected to receive data from an oxygen sensor disposed in air metering system 520. Depending on engine requirements, total air volume and oxygen content may be controlled by suitably adjusting valve 526 to mix the oxygen enriched stream with a desired amount of ambient air. In addition, controller 550 may increase the operating speed of pump 518 and pump 532 to increase the volume and/or extent of oxygen enrichment of treated air supplied to the air motoring system. Controller 550 may also be connected to control the use of the oxygen-depleted air stream via a connection to diverter 540.

Additionally, it may be helpful for controller 550 to receive information as to engine air requirements. For example, engine speed information may be supplied by connection to a suitable tachometer. Likewise, controller 550 may receive information concerning the rate at which fuel is supplied to the engine, and/or determine this rate via a control signal to a fuel pump. Various other modalities are know in the art of engine control, which may be adapted to determine fuel, air and oxygen requirements for engine 508 under different load conditions, and to send appropriate control signals to the components of system 500 to supply a desired volume of air having an optimal oxygen content for the given load condition.

For example, in a naturally aspirated engine system, volumetric efficiency decreases at higher operating speeds. At the same time, at higher speeds and loads, the optimal air/fuel ratio may increase somewhat. Controller 550 may be programmed to increase the oxygen content of air supplied to the engine 508 to compensate for the loss in volumetric efficiency at high speeds, while at the same time adjusting for an optimal air fuel ratio. This may be accomplished, for example, by increasing the proportion of oxygen-enriched air via the air metering system, or by increasing the extent of oxygen enrichment by boosting the voltage supplied to separator system 510. Similar adjustments may be made if the engine inlet air is pressurized, such as by pump 518. One of ordinary skill may develop an appropriate control scheme by calibrating the response of separator system 510 and its associated components to different operating conditions, and by developing algorithms that produce appropriate control inputs in response to measured or determined engine air and fuel requirements. The optimal control scheme will, of course, vary depending on the engine design and application requirements.

For some applications, controller 550 may be omitted, and system 500 may be configured as a self-regulating system. For example, the input voltage to oxygen separator 510 may be held constant, and the anode-side exhaust port 514 may be connected directly to the engine vacuum at the intake manifold 516. The ports 512, 514, 515 of the oxygen separator may be configured so that the oxygen separation system reaches its maximum oxygen output when the engine draws its maximum vacuum. When its supply voltage is fixed, oxygen output from the oxygen separation system 510 will generally increase as pressure in the ionization chamber is reduced below atmospheric. This occurs because ionization of oxygen, and free movement of oxygen ions towards the anode side, both increase as pressure is reduced. But below a certain optimal pressure, which will vary depending on the design of the oxygen separation system, the mass flow of oxygen decreases as the total oxygen throughput decreases with decreasing pressure. Thus, the system may be designed

What is claimed is:

1. A system for conditioning intake air for an internal combustion engine, the system comprising:
   an oxygen separation system operative to separate oxygen from air and to discharge separate exhaust streams, a first one of the exhaust streams being enriched in oxygen, wherein the oxygen separation system further comprises a substantially sealed passageway connecting a first exhaust port for the first exhaust stream with a second exhaust port for a second exhaust stream, and an entry port into the passageway between the first exhaust port and the second exhaust ports;
   a first suction source connected to the oxygen separation system, configured to suction the first exhaust stream from the oxygen separation system;
   an internal combustion engine receiving the first exhaust stream for use in combustion; and
   a second suction source connected to the oxygen separation system, configured to suction the second exhaust stream from the oxygen separation system.

2. The system of claim 1, wherein the oxygen separation system further comprises a first gas-permeable electrode disposed across the passageway, and a second gas permeable electrode disposed across the passageway.

3. The system of claim 2, wherein the oxygen separation system further comprises a chamber bounded by the first and second gas-permeable electrodes, the entry port opening into the chamber.

4. The system of claim 3, wherein the entry port comprises a plurality of small openings leading into the chamber.

5. The system of claim 2, further comprising a high-voltage source connected to the first and second gas-permeable electrodes, whereby a static electric field is maintained between the first and second electrodes.

6. The system of claim 4, wherein the high-voltage source comprises an ignition coil for the internal combustion engine.

7. The system of claim 1, wherein the oxygen separation system further comprises at least three gas-permeable electrodes disposed across the passageway between the first and second exhaust ports.

8. The system of claim 7, further comprising a voltage divider connected to the at least three electrodes, the voltage divider dividing a voltage output from a high-voltage source among the at least three electrodes.

9. The system of claim 1, wherein the first suction source comprises an air intake manifold of the internal combustion engine.

10. The system of claim 1, wherein the oxygen separation system further comprises an entry port sized to result in a maximum oxygen output from the oxygen separation system when the internal combustion engine is operating at its peak power speed.

11. The system of claim 1, wherein the first suction source comprises an air pump.

12. The system of claim 1, wherein the first suction source comprises a mechanical pump.

13. The system of claim 1, further comprising a line configured to discharge the second exhaust streams into an exhaust system for the internal combustion engine.

14. The system of claim 1, wherein the second suction source comprises a vacuum created using an exhaust stream of the internal combustion engine.

15. The system of claim 1, wherein the second suction source comprises an air pump.

16. The system of claim 1, further comprising an air metering system connected to the oxygen separation system, the air metering system comprising two inlets, a mixing section, and an outlet, wherein a first one of the two inlets is connected to receive the first exhaust stream, and a second one of the two inlets is configured to receive ambient air.

17. The system of claim 16, wherein the outlet of the air metering system is connected to an air intake port for the internal combustion engine.

18. The system of claim 17, wherein the air metering system further comprises a flow control valve configured to control the flow through at least one of the two inlets.

19. The system of claim 1, further comprising an adjustable valve connected in series with an entry port of the oxygen separation system.

20. The system of claim 1, further comprising an air filter connected in series with an entry port of the oxygen separation system.

21. The system of claim 20, further comprising a plenum downstream of the filter, and a plurality of small openings leading from the plenum into the oxygen separation system.

22. The system of claim 1, further comprising an electronic control system configured to control total oxygen flow into the internal combustion engine.

23. The system of claim 22, further comprising an oxygen sensor disposed in the first exhaust streams and connected to provide data to the electronic control system.

24. The system of claim 1, wherein the internal combustion engine comprises a diesel engine.

25. The system of claim 1, wherein the internal combustion engine comprises a gasoline engine.

26. A system for conditioning intake air for an internal combustion engine, the system comprising:
   an oxygen separation system operative to separate oxygen from air and to discharge separate exhaust streams, a first one of the exhaust streams being enriched in oxygen;
   an air metering system connected to the oxygen separation system, the air metering system comprising two inlets, a mixing section, and an outlet, wherein a first one of the two inlets is connected to receive the first exhaust stream, and a second one of the two inlets is configured to receive ambient air;
   a first suction source connected to the oxygen separation system, configured to suction the first exhaust stream from the oxygen separation system;
   an internal combustion engine receiving the first exhaust stream for use in combustion; and
   a second suction source connected to the oxygen separation system, configured to suction a second exhaust stream from the oxygen separation system.

* * * * *